US012468681B1

(12) United States Patent
Walliczek et al.

(10) Patent No.: US 12,468,681 B1
(45) Date of Patent: Nov. 11, 2025

(54) LIVE SYNCHRONIZATION FOR DATABASE DISASTER RECOVERY

(71) Applicant: SAP SE, Walldorf (DE)

(72) Inventors: Matthias Walliczek, Wiesloch (DE); Jochen Wilhelm, Sandhausen (DE); Rouven Krebs, Römerberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/907,927

(22) Filed: Oct. 7, 2024

(51) Int. Cl.
*G06F 16/23* (2019.01)
*G06F 16/27* (2019.01)

(52) U.S. Cl.
CPC ........ *G06F 16/2358* (2019.01); *G06F 16/275* (2019.01)

(58) Field of Classification Search
None
See application file for complete search history.

(56) References Cited

U.S. PATENT DOCUMENTS

| | | | |
|---|---|---|---|
| 9,251,017 B2 * | 2/2016 | Bogdanov | G06F 11/20 |
| 10,198,330 B2 | 2/2019 | Boshev et al. | |
| 10,261,872 B2 | 4/2019 | Boshev et al. | |
| 10,275,346 B2 | 4/2019 | Boshev et al. | |
| 10,402,229 B2 | 9/2019 | Dimitrov et al. | |
| 11,269,775 B2 | 3/2022 | Krebs et al. | |
| 11,675,809 B2 * | 6/2023 | Stolze | G06F 16/2282 707/625 |
| 12,124,474 B2 * | 10/2024 | Sonawane | G06F 16/27 |
| 2013/0179480 A1 * | 7/2013 | Agarwal | G06F 16/16 707/822 |
| 2016/0182631 A1 * | 6/2016 | Anglin | G06F 11/1464 709/219 |
| 2018/0137015 A1 * | 5/2018 | Boshev | G06F 16/27 |
| 2018/0217869 A1 | 8/2018 | Dimitrov et al. | |
| 2020/0310928 A1 | 10/2020 | Neichev et al. | |

* cited by examiner

*Primary Examiner* — Debbie M Le
(74) *Attorney, Agent, or Firm* — Fish & Richardson P.C.

(57) ABSTRACT

This disclosure describes systems, software, and computer implemented methods for synchronizing between a primary and a secondary computing system, including receiving instructions to perform a change to a primary computing system database; performing the change to the database; logging the change in a database log; receiving instructions to change the portion of the database stored in the cache memory; performing a change to a registry based on the change of the portion of the database; generating a sync message by: encoding the change to the registry in a message with an identifier of the registry changed; obtaining a log indicating previous database changes logged in the database change log since a prior sync message was sent; appending the previous database changes since the prior sync message was sent to the message; and encoding the sync message as an object.

20 Claims, 3 Drawing Sheets

LIVE SYNCHRONIZATION FOR DATABASE DISASTER RECOVERY

BACKGROUND

Many server applications rely on two different data storages—a first storage such as a database to store data permanently, and a second storage that is a temporary storage (i.e., a random access memory (RAM)) to store the application state. While the database can be stored at a specific server and connected via network, the RAM is often placed physically close to the CPU and provides faster access. To mask the slower network access to the database often specific data sets from the database are stored in caches in the RAM memory as part of the application state.

SUMMARY

The present disclosure involves systems, software, and computer implemented methods for synchronizing between a primary and a secondary computing system, including receiving instructions to perform a change to a primary computing system database, the primary computing system comprising one or more registries, each registry maintaining a cache memory storing a copy of a portion of the database; performing the change to the database; logging the change in a database log; receiving instructions to change the portion of the database stored in the cache memory; performing a change to a registry based on the change of the portion of the database; generating a sync message by: encoding the change to the registry in a message with an identifier of the registry changed; obtaining a log indicating previous database changes logged in the database change log since a prior sync message was sent; appending the previous database changes since the prior sync message was sent to the message; and encoding the sync message as an object; and sending the sync message to a secondary computing system to provide instructions to change a secondary cache and a secondary database.

Implementations can optionally include one or more of the following features.

In some instances, the primary computing system database is managed by a landscape management service, and the secondary computing system is managed by the landscape management service.

In some instances, logging the change in the database change long includes logging the change and an ID of a database object stored in the portion of the database being modified with the change.

In some instances, the secondary computing system includes one or more registries, each registry maintaining a cache memory storing a copy of a portion of the database.

In some instances, encoding the sync message as the object includes assigning the sync message a serial number and formatting the sync message as a JavaScript Object Notation (JSON) object.

In some instances, operations include decoding, by the secondary computing system, the sync message; and updating a registry of the secondary computing system and a database of the secondary computing system according to the sync message.

In some instances, the cache memory and secondary cache are random access memory (RAM) storages.

The details of these and other aspects and embodiments of the present disclosure are set forth in the accompanying drawings and the description below. Other features, objects, and advantages of the disclosure will be apparent from the description, drawings, and claims.

DESCRIPTION OF DRAWINGS

Some example embodiments of the present disclosure are illustrated by way of example and not limitation in the figures of the accompanying drawings, in which like reference numbers indicate similar elements.

DETAILED DESCRIPTION

This disclosure describes methods, software, and systems for providing online synchronization between applications or systems that are executed with a primary instance and one or more backup instances. Each one of the instances of the application or system can run on separate server nodes part of the computing landscape. In some instances, the system can be a database system and can be executed in a cloud environment or as an on-premises database system, where data synchronization can be performed between a backup system instance and the primary instance of the database system. In some instances, an application or service (e.g., a business application) can rely on two different data storages: i) a database to store data permanently, and ii) a cache of main memory (RAM memory) to store an application state. While the database will typically be stored at a specific server (or hard disk) and connected via network, the RAM is placed in direct communication with the CPU or other processing units (e.g., GPU, TPU etc.) which provides for faster access from applications or systems running on the computer. To mask the comparatively slower network access to the database, specific data sets from the database can be stored in caches in the RAM memory as part of the application state. Therefore, in order to transfer a running application from one server to another (e.g., from the primary to the backup), both the database and the application state (or what is stored in the RAM) must be switched to provide seamless to running operations.

In some instances, a landscape management system can be instantiated to support simplified, automated, and centralized management of the operations of the computing landscape wherein different systems, applications, and or services are running. The landscape management system can run at different server nodes of the computing landscape and can have a primary instances that runs as the primary server node of the computing landscape as well as one or more secondar instances (e.g., backup instances that are in a passive mode while the instance on the primary server node runs in an active mode). In some example landscape, such as in the context of SAP Enterprise Cloud Services (ECS), there can be a very high number of instances of applications and services that are hosted at different server nodes. These instances and server nodes, as part of a computing environment, can be managed through a landscape management system. The landscape management system can be configured to monitor and support the computing environment to provide highly available applications and services that have minimal downtime in their operations. In some instances, the landscape management system can be executed with multiple instances running at each server node of the computing landscape. In some instances, the landscape management system can implement a disaster recovery (DR) mechanism. Parallel to an active landscape management system instance a second landscape management system instance can execute in a passive (or standby) mode and be able to become active when or if the primary instance fails. For example, if a primary server node (in an active state) in the computing landscape experiences a failure, another server node in the computing landscape can transferred to an active state to support further operations requested at the computing landscape (instead of the primary server node). The ability to keep the configuration and the landscape data between the two instances in sync is important in providing the ability for the second landscape management system instance to become active without loss of data due to the second landscape having outdated data.

Conventional methods perform this data replication using a daily full sync. This sync involves a backup of the secondary, reset of the secondary (e.g., a complete memory wipe) and import of the data from the primary. The conventional approach has many drawbacks because it can take longer than three hours in some computing environments (e.g., cloud environments or on-premises environment) to transfer the data between the different nodes. During this time span the secondary is in an inconsistent state and cannot be activated immediately. Another shortcoming of the conventional method is that the daily sync results in potential loss of the data of the last 24 hours after the last sync because in the event of a disaster, the system will need to revert to the previous sync, which can be up to 24 hours in the past. Additionally, using this conventional method, the primary node will create a report to be exported for backup. This can create a heavy load at the primary instance to generate the full export and be computationally expensive.

In general, this disclosure describes a solution for an already implemented cluster of virtual machines (or nodes) that are setup using a shared database a mechanism to synchronize the memory cache in the registries. Therefore, after each change regarding the configuration a message can be sent to all cluster nodes. This message can include the name of the registry and optional the ID of the object if the change affects only one object. Each registry of the each node receiving the message can refresh their respective cache either of the specified object or for all entries. These messages can be enriched with the corresponding database changes, serialized it to, for example JSON, and send to the secondary. The secondary then can deserialize the JSON, adapt its database with the contained changes, and send the message to its registries to update the in-memory cache.

This disclosure realizes significant advantages. By implementing this solution, the risk of outage and inconsistent data in critical systems is significantly reduced. Further, the computational load and therefore scalability of cloud-based strategies is enhanced. Because during typical use most changed settings in the configuration result in an UPDATE of a table row and this solution filters only the changed columns, the changelog may also serve as a human readable changelog for the configuration. A user is able to look up which column was changed at which date by which user which enhances security and troubleshooting capabilities. Further, recording the old values enables the provision of an Undo command, enabling a database revert a complete change.

Because the distribution of the changelog is designed to be capable of multi-targets, that is multiple passive instances synchronizing with a single active instance, additional targets will cause only minimal overhead. So additional to the disclosed solution can also sync the changes to an additional landscape management instance(s) that can serve as read only proxies or additional backups to provide information about the configuration to specific clients. This will further reduce the load of the primary instance.

The solution is also flexible. Additional targets can be different consumer products such as Cloud Landscape Directory (CLD) that are interested in changes to the Landscape and could receive and parse the changelog stream. In other words, the secondary system need not be identical in software or hardware to the primary system.

Figure 1:
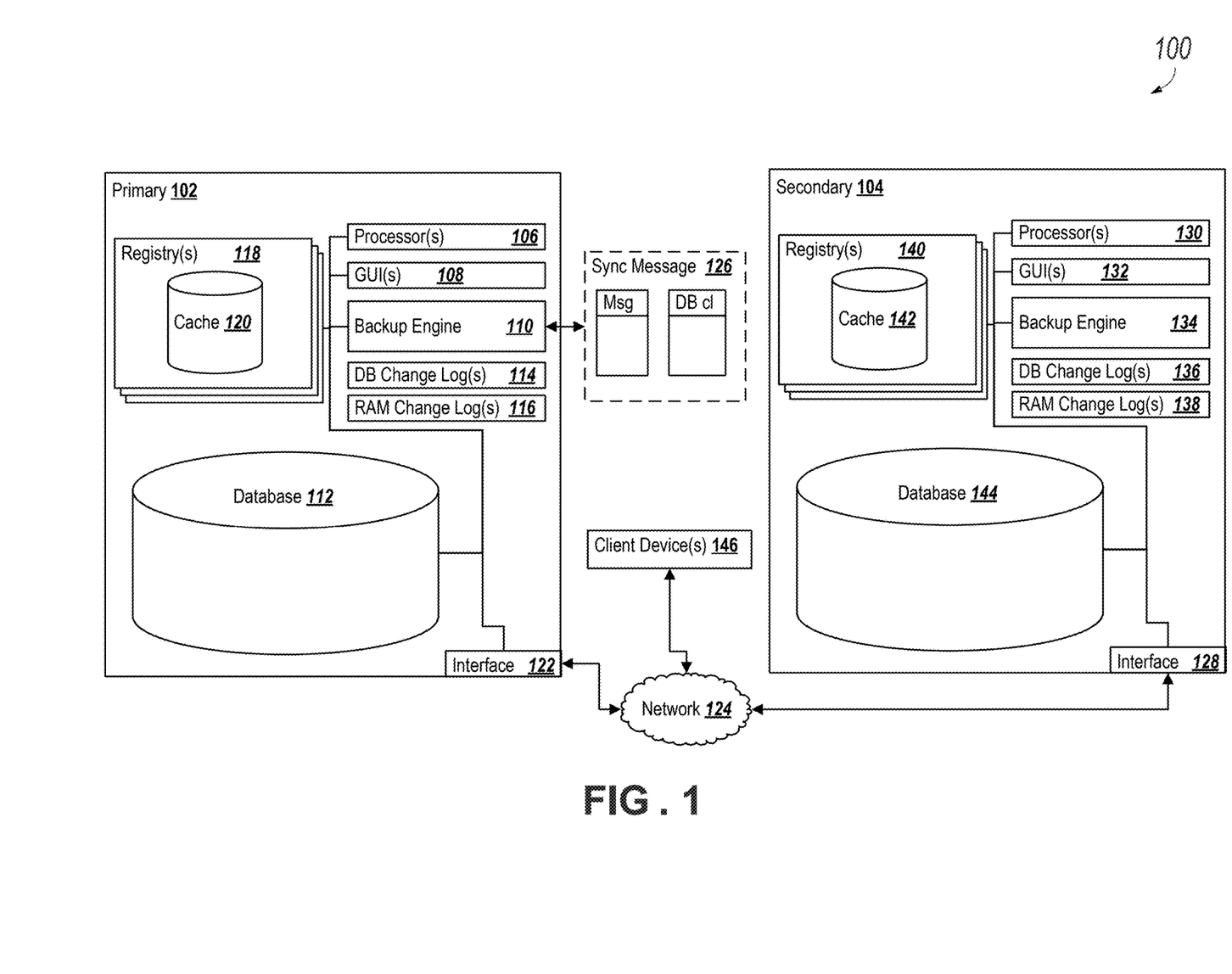
FIG. 1 illustrates a schematic diagram of a system 100 for live synchronization of backup databases.

Turning to the illustrated example implementations, FIG. 1 illustrates a schematic diagram of a system 100 for live synchronization of backup databases. The system 100 includes a primary computing cluster 102 and a secondary computing cluster 104. The primary computing cluster 102 can provide various services and data management functions to client devices 146 who access the primary cluster 102 through network 124. In the event of a failure of the primary 102, the secondary cluster 104 can provide continued service and minimize or eliminate data loss, preventing any perceivable interruptions by the client devices 146. However, to achieve continuous service in the event of a failure (e.g., disaster recovery capabilities), the secondary cluster 104 is configured to change its state into an active application state and to activate the database 144 at the secondary cluster 104 so that the secondary cluster 104 can that match the states of the primary cluster 102 including the database 112.

Primary cluster 102 includes one or more processors 106, user interfaces 108, a backup engine 110, a database change log 114, a RAM change log 116, a database 112, registries 118 each with a cache memory 120, and an interface 122. In some implementations, the primary cluster 102 includes multiple instances of each illustrated component, managed by a landscape managing system. A landscape management system can be a system or orchestrator that automates or standardizes a cloud or remote computing landscape. In some implementations the landscape management service can be a centralized landscape orchestration service. Although illustrated as a single processor 106 in FIG. 1, multiple processors can be used according to particular needs, desires, or particular implementations of the system 100. Each processor 106 can be a central processing unit (CPU), an application specific integrated circuit (ASIC), a field-programmable gate array (FPGA), or another suitable component. Generally, the processor 106 executes instructions and manipulates data to perform the operations of the primary computing cluster 102. Specifically, the processor 106 executes the algorithms and operations described in the illustrated figures, as well as the various software modules and functionality, including the functionality for sending communications to and receiving transmissions from client devices 146, secondary cluster 104, as well as to other devices and systems. Each processor 106 can have a single or multiple cores, with each core available to host and execute an individual processing thread. Further, the number of, types of, and particular processors 106 used to execute the operations described herein can be dynamically determined based on a number of requests, interactions, and operations associated with the primary computing cluster 102.

GUI 108 of the primary cluster 102 interfaces with at least a portion of the system 100 for any suitable purpose, including generating a visual representation of any particular client devices 146 and/or the content associated with any components of the database 112 or registries 118. In particular, the GUI 108 can be used to present results of a query, or allow the user to input queries to the primary cluster 102, as well as to otherwise interact and present information associated with one or more applications. GUI 108 can also be used to view and interact with various web pages, applications, and web services located local or external to the client device 146. Generally, the GUI 108 provides the user with an efficient and user-friendly presentation of data provided by or communicated within the system. The GUI 108 can comprise a plurality of customizable frames or views having interactive fields, pull-down lists, and buttons operated by the user. In general, the GUI 108 is often configurable, supports a combination of tables and graphs (bar, line, pie, status dials, etc.), and is able to build real time portals, application windows, and presentations. Therefore, the GUI 108 contemplates any suitable graphical user interface, such as a combination of a generic web browser, a web-enable application, intelligent engine, and command line interface (CLI) that processes information in the platform and efficiently presents the results to the user visually.

The database 112 can be a long-term storage device housing a vast quantity of data. Database 112 of the primary cluster 102 can represent a single memory or multiple memories. The database 112 can include any memory or database module and can take the form of volatile or non-volatile memory including, without limitation, magnetic media, optical media, random access memory (RAM), read-only memory (ROM), removable media, or any other suitable local or remote memory component. The database 112 can store various objects or data, including application data, user and/or account information, administrative settings, password information, caches, applications, backup data, repositories storing business and/or dynamic information, and any other appropriate information associated with the primary cluster 102, including any parameters, variables, algorithms, instructions, rules, constraints, or references thereto. Additionally, the database 112 can store any other appropriate data, such as VPN applications, firmware logs and policies, firewall policies, a security or access log, print or other reporting files, as well as others. While illustrated within the primary cluster 102, database 112 or any portion thereof, including some or all of the particular illustrated components, can be located remote from the primary cluster 102 in some instances, including as a cloud application or repository. In those instances, the data stored in database 112 can be accessible, for example, via one of the described applications or systems.

Because accessing the database 112 can occur via the network 124, and can be relatively slow, a registry 118 including a cache 120 of random-access memory (RAM) can be located physically near the processors 106 and can provide rapid access to certain commonly used or currently active database assets. In some implementations, there is a registry 118 and an associated memory cache 120 for each primary cluster 102 within the landscape managed by the primary cluster 102.

Backup engine 110 can be a software application executing on the primary cluster 102 that is responsible for sending, receiving, and executing backup instructions to enable the secondary cluster 104 to match its registries 140 and database 144 to the primary cluster 102. In general, as a client device 146 or other system interacts with the database 112 and the cache 120 and changes their states, the backup engine 110 records these changes. Backup engine 110 can create and maintain a database change log 114 which indicates which objects in the database are changed, including additions of new objects, deletion of objects, or edits/modifications of objects. In some implementations, each entry in the database change log 114 is serialized, timestamped or both, to allow for versioning and asynchronous updating.

Backup engine 110 can also generate and maintain a RAM change log 116, which can list pending changes made to the cache(s) 120 of each registry 118 for which a sync message 126 need be generated. When a change to a registry 118 occurs, the backup engine 110 can generate a synch message 126, which includes the registry change, and an ID of the particular registry 118 that was changed. The backup engine 110 can then append the database change logs 114, at least for any database changes that occurred since the previous synch message, to the sync message 126, which can be serialized, encoded (e.g., as a JSON object), and send to the secondary cluster 104 using a messagebus system. In some implementations, every registry change can act as a trigger event, that queues the backup engine 110 for generation and transmission of a synch message 126.

The primary cluster 102 communicates with the secondary 104 using an interface 122. The interface 122 is used by the primary cluster 102 for communicating with other systems in a distributed environment—including within the system 100—connected to the network 124, e.g., secondary cluster 104, client devices 146, and other systems communicably coupled to the illustrated primary cluster 102 and/or network 124. Generally, the interface 122 comprises logic encoded in software and/or hardware in a suitable combination and operable to communicate with the network 124 and other components. More specifically, the interface 122 can comprise software supporting one or more communication protocols associated with communications such that the network 124 and/or interface 122 hardware is operable to communicate physical signals within and outside of the illustrated system 100. Still further, the interface 122 can allow the client device 146 to communicate with the primary computing cluster 102 and/or other portions illustrated within the system 100 to perform the operations described herein.

Network 124 facilitates wireless or wireline communications between the components of the system 100 (e.g., between the primary cluster 102, the client devices 146, etc.), as well as with any other local or remote computers, such as additional mobile devices, clients, servers, or other devices communicably coupled to network 124, including those not illustrated in FIG. 1.

In the illustrated environment, the network 124 is depicted as a single network, but can comprise more than one network without departing from the scope of this disclosure, so long as at least a portion of the network 124 can facilitate communications between senders and recipients. In some instances, one or more of the illustrated components (e.g., the database 112 or database 144, the backup engine 110, etc.) can be included within or deployed to network 124 or a portion thereof as one or more cloud-based services or operations. The network 124 can be all or a portion of an enterprise or secured network, while in another instance, at least a portion of the network 124 can represent a connection to the Internet. In some instances, a portion of the network 124 can be a virtual private network (VPN). Further, all or a portion of the network 124 can comprise either a wireline or wireless link. Example wireless links can include 802.11a/b/g/n/ac, 802.20, WiMax, LTE, and/or any other appropriate wireless link. In other words, the network 124 encompasses any internal or external network, networks, sub-network, or combination thereof operable to facilitate communications between various computing components inside and outside the illustrated system 100. The network 124 can communicate, for example, Internet Protocol (IP) packets, Frame Relay frames, Asynchronous Transfer Mode (ATM) cells, voice, video, data, and other suitable information between network addresses. The network 124 can also include one or more local area networks (LANs), radio access networks (RANs), metropolitan area networks (MANs), wide area networks (WANs), all or a portion of the Internet, and/or any other communication system or systems at one or more locations.

The secondary cluster 104 can be identical to the primary cluster 102, with a similar processor 130, GUI(s) 132, backup engine 134, interface 128, database 144, registries 140, cache 142, as well as database change logs 136 and RAM change logs 138. The secondary cluster 104 can operate in a standby mode in most instances, and will switch or begin servicing client devices 146 in the event of a failure of the primary cluster 102.

The secondary cluster 104 generally uses backup engine 134 to consume sync messages 126, and update it's respective registries 140 and database 144 as described in more detail below with respect to FIG. 2.

Figure 2:
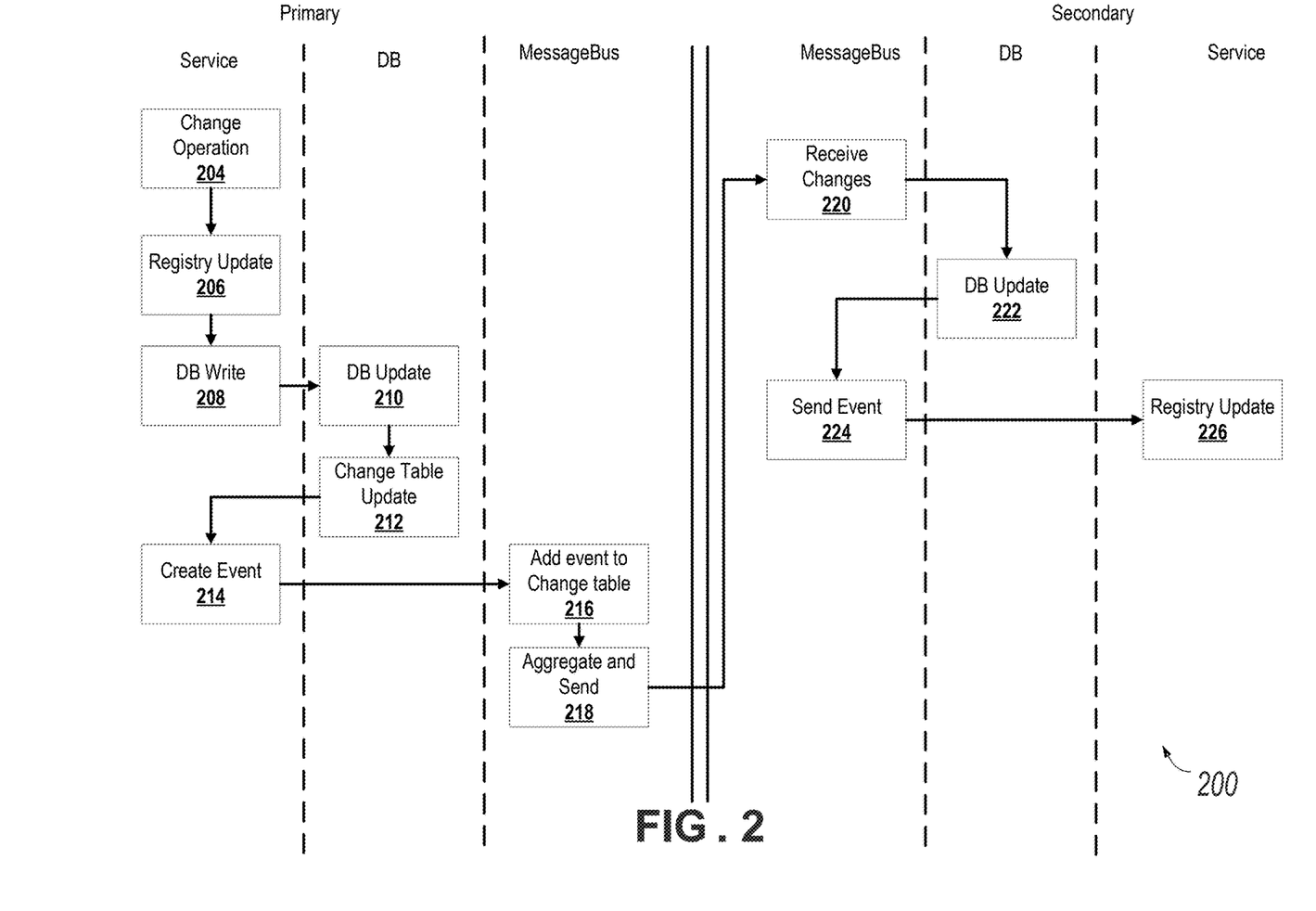
FIG. 2 is a flowchart of an example process 200 for live synchronization of backup databases.

FIG. 2 is a flowchart of an example process 200 for live synchronization of backup databases. It will be understood that process 200 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute process 200. In some implementations, the process 200 and related methods are executed by one or more components of the system 100 described above with respect to FIG. 1, such as the primary cluster 102 and the secondary cluster 104, and/or portions thereof.

At 204, a change operation is received within the database of the primary cluster. The change operation can be addition of a new dataset (e.g., new table) or a modification of an existing dataset (e.g., new row or column in a table, or a new value within an existing row or column). In some implementations, the change can be the deletion or removal of data from the dataset.

At 206, upon receipt of the change operation, the primary cluster service can update the cache memory in the appropriate registry as needed to ensure rapid access is possible by the user. In some implementations, the change operation is analyzed using heuristics to identify whether the changed data is necessary to be maintained within the registry or not. The change is then applied to the registry.

At 208, a database write command is sent to the database. The database write command can indicate which software object(s) are to change and how. For example, the command can indicate what new values are to be inserted into which tables or locations.

At 210, the database receives the update command, and updates its data (e.g., data records, columns, rows, file information) accordingly. It should be noted that an update or "write" operation is not limited to the action of adding new data, but modifying existing data, or deleting existing data are within the scope of "write" or "update."

At 212, the database updates a change table. The change table can record each database change which can be collected or aggregated over a period of time. In some implementations each entry to this table is given an ascending ID using database functions such as autoincrement. This enables serialization and export of limited sets of changes to secondary systems. During each message handling all entries of the changelog table can be read, and the last ID is saved, to allow collecting only the new entries at the new run, which reduces the network traffic and message size.

At 214, an event is created that triggers creation of the message. The event collects database changes from the change table. To collect the database changes, a "trigger" functionality can be used. For example, database systems like SAP HANA, SAP MaxDB and PostgreSQL all incorporate a trigger function. The created event implements a trigger for an INSERT, UPDATE and DELETE operation on all tables to record the changes and write an entry to a specific changelog table. In some implementations, the SQL code to create the trigger is generated based on the previous analyzed table layout. In some implementations during an UPDATE only the changed columns are listed, to reduce network traffic.

At 216, the MessageBus, upon receipt of the trigger adds the event to the change table. The MessageBus can be a database functionality that handles both message broker and trigger events. In general, MessageBus can generate messages, and broadcast them for consumption by one or more recipients. In some implementations, the recipients can subscribe to certain MessageBuses and asynchronously read messages transmitted. For example, the secondary cluster can subscribe to the primary cluster's message bus, where it will be pushed messages from the primary cluster as they are sent. A MessageBus uses a registry, where multiple receiver classes can be registered for specific event IDs. After a message is send to the MessageBus, all receivers for the given event ID are notified of the new message.

At 218, the changes within the change table are aggregated back to the pervious trigger event, and compiled into a message which is submitted. In some implementations the message is a metadata object such as a JSON, XML, YAML, CSV or other object. For example, the MessageBus can collect all new recorded database changes from the changelog table, synchronize the message object and the database changes from JSON and send this message to all registered receivers.

At 220, the changes in the message are received by the secondary cluster. The secondary cluster then performs a database update (222) and sends the event to the service (224) (e.g., the backup engine 134 of FIG. 1).

At 226, the secondary cluster's service can update its registry accordingly, resulting in both a secondary database and secondary registry that have matched state with the primary.

Figure 3:
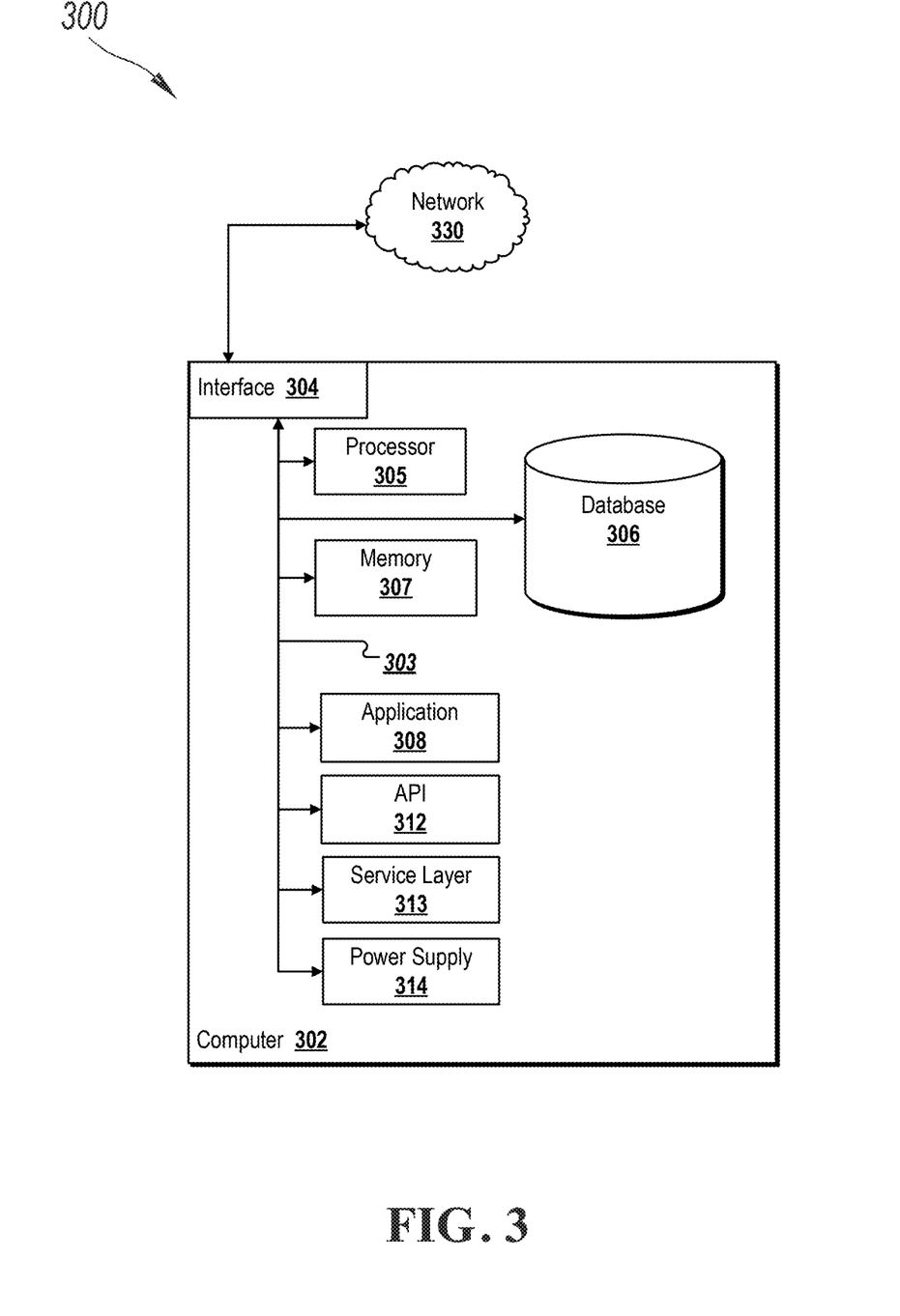
FIG. 3 is a block diagram illustrating an example of a computer-implemented system.

FIG. 3 is a block diagram illustrating an example of a computer-implemented system. 300 used to provide computational functionalities associated with described algorithms, methods, functions, processes, flows, and procedures, according to an implementation of the present disclosure. In the illustrated implementation, system 300 includes a computer 302 and a network 330.

The illustrated computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 302 can include an input device, such as a keypad, keyboard, or touch screen, or a combination of input devices that can accept user information, and an output device that conveys information associated with the operation of the computer 302, including digital data, visual, audio, another type of information, or a combination of types of information, on a graphical-type user interface (UI) (or GUI) or other UI.

The computer 302 can serve in a role in a distributed computing system as, for example, a client, network component, a server, or a database or another persistency, or a combination of roles for performing the subject matter described in the present disclosure. The illustrated computer 302 is communicably coupled with a network 330. In some implementations, one or more components of the computer 302 can be configured to operate within an environment, or a combination of environments, including cloud-computing, local, or global.

At a high level, the computer 302 is an electronic computing device operable to receive, transmit, process, store, or manage data and information associated with the described subject matter. According to some implementations, the computer 302 can also include or be communicably coupled with a server, such as an application server, e-mail server, web server, caching server, or streaming data server, or a combination of servers.

The computer 302 can receive requests over network 330 (for example, from a client software application executing on another computer 302) and respond to the received requests by processing the received requests using a software application or a combination of software applications. In addition, requests can also be sent to the computer 302 from internal users (for example, from a command console or by another internal access method), external or third-parties, or other entities, individuals, systems, or computers.

Each of the components of the computer 302 can communicate using a system bus 303. In some implementations, any or all of the components of the computer 302, including hardware, software, or a combination of hardware and software, can interface over the system bus 303 using an application programming interface (API) 312, a service layer 313, or a combination of the API 312 and service layer 313. The API 312 can include specifications for routines, data structures, and object classes. The API 312 can be either computer-language independent or dependent and refer to a complete interface, a single function, or even a set of APIs. The service layer 313 provides software services to the computer 302 or other components (whether illustrated or not) that are communicably coupled to the computer 302. The functionality of the computer 302 can be accessible for all service consumers using the service layer 313. Software services, such as those provided by the service layer 313, provide reusable, defined functionalities through a defined interface. For example, the interface can be software written in a computing language (for example, JAVA or C++) or a combination of computing languages, and providing data in a particular format (for example, extensible markup language (XML)) or a combination of formats. While illustrated as an integrated component of the computer 302, alternative implementations can illustrate the API 312 or the service layer 313 as stand-alone components in relation to other components of the computer 302 or other components (whether illustrated or not) that are communicably coupled to the computer 302. Moreover, any or all parts of the API 312 or the service layer 313 can be implemented as a child or a sub-module of another software module, enterprise application, or hardware module without departing from the scope of the present disclosure.

The computer 302 includes an interface 304. Although illustrated as a single interface 304, two or more interfaces 304 can be used according to particular needs, desires, or particular implementations of the computer 302. The interface 304 is used by the computer 302 for communicating with another computing system (whether illustrated or not) that is communicatively linked to the network 330 in a distributed environment. Generally, the interface 304 is operable to communicate with the network 330 and includes logic encoded in software, hardware, or a combination of software and hardware. More specifically, the interface 304 can include software supporting one or more communication protocols associated with communications such that the network 330 or hardware of interface 304 is operable to communicate physical signals within and outside of the illustrated computer 302.

The computer 302 includes a processor 305. Although illustrated as a single processor 305, two or more processors 305 can be used according to particular needs, desires, or particular implementations of the computer 302. Generally, the processor 305 executes instructions and manipulates data to perform the operations of the computer 302 and any algorithms, methods, functions, processes, flows, and procedures as described in the present disclosure.

The computer 302 also includes a database 306 that can hold data for the computer 302, another component communicatively linked to the network 330 (whether illustrated or not), or a combination of the computer 302 and another component. For example, database 306 can be an in-memory or conventional database storing data consistent with the present disclosure. In some implementations, database 306 can be a combination of two or more different database types (for example, a hybrid in-memory and conventional database) according to particular needs, desires, or particular implementations of the computer 302 and the described functionality. Although illustrated as a single database 306, two or more databases of similar or differing types can be used according to particular needs, desires, or particular implementations of the computer 302 and the described functionality. While database 306 is illustrated as an integral component of the computer 302, in alternative implementations, database 306 can be external to the computer 302. The database 306 can hold any data type necessary for the described solution.

The computer 302 also includes a memory 307 that can hold data for the computer 302, another component or components communicatively linked to the network 330 (whether illustrated or not), or a combination of the computer 302 and another component. Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307, two or more memories 307 or similar or differing types can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in the present disclosure. For example, application 308 can serve as one or more components, modules, or applications. Further, although illustrated as a single application 308, the application 308 can be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or another power management functionality). In some implementations, the power supply 314 can include a power plug to allow the computer 302 to be plugged into a wall socket or another power source to, for example, power the computer 302 or recharge a rechargeable battery.

There can be any number of computers 302 associated with, or external to, a computer system containing computer 302, each computer 302 communicating over network 330. Further, the term "client," "user," or other appropriate terminology can be used interchangeably, as appropriate, without departing from the scope of the present disclosure. Moreover, the present disclosure contemplates that many users can use one computer 302, or that one user can use multiple computers 302.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A computer-implemented method comprising:
receiving instructions to perform a change to a persistent storage of a primary computing system, wherein the primary computing system comprises one or more registries, each registry maintaining a primary cache memory storing a copy of a portion of data stored in the persistent storage of the primary computing system;
performing the change to the data stored in the persistent storage of the primary computing system;
logging the change in a data change log;
receiving instructions to change the copy of the portion of the data stored in the primary cache memory;
performing a change to the copy of the portion of the data stored in the primary cache memory;
generating a sync message by:
encoding the change to the copy of the portion of the data in a message with an identifier of the registry changed;
obtaining a log indicating previous data changes logged in the data change log since a prior sync message was sent;
appending the previous data changes since the prior sync message to the sync message; and
encoding the sync message as an object; and
sending the sync message to a secondary computing system to provide instructions to change a secondary cache memory and a persistent storage of the secondary computing system.

2. The method of claim 1, wherein the persistent storage of the primary computing system and the persistent storage of the secondary computing system are databases managed by a landscape management service.

3. The method of claim 1, wherein logging the change in the data change log comprises logging the change and an identifier (ID) of a database object that is in the portion of the data being modified with the change.

4. The method of claim 1, wherein the secondary computing system comprises one or more registries, each registry maintaining a respective secondary cache memory storing a respective copy of a portion of the data.

5. The method of claim 1, wherein encoding the sync message as the object comprises assigning the sync message a serial number and formatting the sync message as a JavaScript Object Notation (JSON) object.

6. The method of claim 1, comprising:
decoding, by the secondary computing system, the sync message; and
updating the secondary cache memory of the secondary computing system and the secondary persistent storage of the secondary computing system according to the sync message.

7. The method of claim 1, wherein the primary cache memory and the secondary cache memory are random access memory (RAM) storages.

8. A non-transitory computer-readable storage medium coupled to one or more processors and having instructions stored thereon which, when executed by the one or more processors, cause the one or more processors to perform operations for building a terminology dictionary, the operations comprising:
- receiving instructions to perform a change to a persistent storage of a primary computing system, wherein the primary computing system comprises one or more registries, each registry maintaining a primary cache memory storing a copy of a portion of data stored in the persistent storage of the primary computing system;
- performing the change to the data stored in the persistent storage of the primary computing system;
- logging the change in a data change log;
- receiving instructions to change the copy of the portion of the data stored in the primary cache memory;
- performing a change to the copy of the portion of the data stored in the primary cache memory;
- generating a sync message by:
  - encoding the change to the copy of the portion of the data in a message with an identifier of the registry changed;
  - obtaining a log indicating previous data changes logged in the data change log since a prior sync message was sent;
  - appending the previous data changes since the prior sync message to the sync message; and
  - encoding the sync message as an object; and
- sending the sync message to a secondary computing system to provide instructions to change a secondary cache memory and a persistent storage of the secondary computing system.

9. The medium of claim 8, wherein the persistent storage of the primary computing system and the persistent storage of the secondary computing system are databases managed by a landscape management service.

10. The medium of claim 8, wherein logging the change in the data change log comprises logging the change and an identifier (ID) of a database object that is in the portion of the data being modified with the change.

11. The medium of claim 8, wherein the secondary computing system comprises one or more registries, each registry maintaining a respective secondary cache memory storing a respective copy of a portion of the data.

12. The medium of claim 8, wherein encoding the sync message as the object comprises assigning the sync message a serial number and formatting the sync message as a JavaScript Object Notation (JSON) object.

13. The medium of claim 8, the operations comprising:
- decoding, by the secondary computing system, the sync message; and
- updating the secondary cache memory of the secondary computing system and the persistent storage of the secondary computing system according to the sync message.

14. The medium of claim 8, wherein the primary cache memory and the secondary cache memory are random access memory (RAM) storages.

15. A system, comprising:
- one or more computers; and
- a computer-readable storage device coupled to the one or more computers and having instructions stored thereon which, when executed by the one or more computer, cause the one or more computers to perform operations for building a terminology dictionary, the operations comprising:
  - receiving instructions to perform a change to a persistent storage of a primary computing system, wherein the primary computing system comprises one or more registries, each registry maintaining a primary cache memory storing a copy of a portion of data stored in the persistent storage of the primary computing system;
  - performing the change to the data stored in the persistent storage of the primary computing system;
  - logging the change in a data change log;
  - receiving instructions to change the copy of the portion of the data stored in the primary cache memory;
  - performing a change to the copy of the portion of the data stored in the primary cache memory;
  - generating a sync message by:
    - encoding the change to the copy of the portion of the data in a message with an identifier of the registry changed;
    - obtaining a log indicating previous data changes logged in the data change log since a prior sync message was sent;
    - appending the previous data changes since the prior sync message to the sync message; and
    - encoding the sync message as an object; and
  - sending the sync message to a secondary computing system to provide instructions to change a secondary cache memory and a persistent storage of the secondary computing system.

16. The system of claim 15, wherein the persistent storage of the primary computing system and the persistent storage of the secondary computing system are databases managed by a landscape management service.

17. The system of claim 15, wherein logging the change in the data change log comprises logging the change and an identifier (ID) of a database object that is in the portion of the data being modified with the change.

18. The system of claim 15, wherein the secondary computing system comprises one or more registries, each registry maintaining a respective secondary cache memory storing a respective copy of a portion of the data.

19. The system of claim 15, wherein encoding the sync message as the object comprises assigning the sync message a serial number and formatting the sync message as a JavaScript Object Notation (JSON) object.

20. The system of claim 15, the operations comprising:
- decoding, by the secondary computing system, the sync message; and
- updating the secondary cache memory of the secondary computing system and the persistent storage of the secondary computing system according to the sync message.

* * * * *